3,088,896
OXIDATION OF TRIFLUOROETHANOL
Milton Braid, Springfield Township, Montgomery County, and Francis Lawlor, Philadelphia, Pa., assignors to Pennsalt Chemicals Corporation, Philadelphia, Pa., a corporation of Pennsylvania
No Drawing. Filed July 19, 1957, Ser. No. 672,871
13 Claims. (Cl. 204—158)

This invention relates to the oxidation of 2,2,2-trifluoroethanol, and more particularly provides a process for the oxidation of 2,2,2-trifluoroethanol by contacting said trifluoroethanol with chlorine in the presence of water and under oxidizing conditions, whereby trifluoroacetic acid and trifluoroacetaldehyde hydrate are obtained as products.

Trifluoroacetic acid and the corresponding aldehyde are well known compounds. They are useful for a variety of applications, for example, as metal cleaners, catalysts, condensing agents, and the like, and as intermediates for the synthesis of herbicides, insecticides, dyes and so forth. The use of these compounds has not been widespread, however, because of the difficulty and expense in their manufacture. In accordance with the present invention, provision is made for a simple and relatively inexpensive method by which trifluoroacetic acid and the hydrate of the related aldehye may be made by oxidizing 2,2,2-trifluoroethanol.

The oxidation of 2,2-difluoroethanol with chlorine is known. However, 2,2,2-trifluoroethanol, hereinafter referred to briefly as trifluoroethanol, generally does not resemble 2,2-difluoroethanol in chemical reactions. Thus, for example, it has been reported that 2,2-difluoroethanol can be oxidized to difluoroacetic acid with nitric acid. By contrast, treatment of trifluoroethanol with nitric acid has failed to give oxidation products.

Additionally, fluoro alcohols have successfully been oxidized with chlorine, according to reports in the prior art. Thus, for example, 2,2,3,3,4,4,4-heptafluorobutanol has been contacted with chlorine in an organic solvent to produce the corresponding heptafluorobutyraldehyde. However, when trifluoroethanol is treated with chlorine under these conditions, the solvent is chlorinated, while the fluoro alcohol is recovered unchanged.

It is an object of this invention to provide a novel method for the oxidation of trifluoroethanol.

It is a further object of the present invention to provide a novel method for the oxidation of trifluoroethanol which comprises contacting trifluoroethanol with chlorine in the presence of water under oxidizing conditions.

A particular object is to provide a novel method for the oxidation of trifluoroethanol which comprises contacting trifluoroethanol with chlorine in the presence of an aqueous solution of an alkali metal hydroxide.

Another object is to provide a novel method for the oxidation of trifluoroethanol which comprises contacting trifluoroethanol with chlorine in the presence of water and in the presence of ultraviolet radiation.

Still another object is to provide a method for obtaining trifluoroacetic acid and trifluoroacetaldehyde which comprises the oxidation of trifluoroethanol with chlorine.

These and other objects will be apparent from a consideration of the following specification and claims.

In accordance with this invention, trifluoroethanol is oxidized by contacting it with chlorine in the presence of water under oxidizing conditions.

In one embodiment of this invention, the oxidizing conditions employed comprise the presence of energizing radiation effective for the activation of chlorine. Under these conditions, it is believed that the oxidation reaction proceeds by a free radical mechanism; however, this explanation is not intended to be limiting. To supply external energization to activate chlorine, there may be employed heat, or radiation such as ultraviolet, gamma or high energy electron radiation, or combinations of these agencies. Ultraviolet radiation or a combination of ultraviolet radiation and heat are preferred. With high energy radiation such as ultraviolet radiation, temperatures down to the freezing point of the reaction mixture—which may be, for example, as low as about —20° C.—can be used. The preferred temperature range in the presence of energizing radiation in the present process is 0–100° C. For energization by heat alone, temperatures above about 200° C. will be employed; under these conditions, superatmospheric pressure will preferably be employed to maintain the reactants in contact. Generally temperatures above about 250° C. are to be avoided.

In another embodiment of the present invention, trifluoroethanol is contacted with chlorine in the presence of an aqueous solution of an alkali hydroxide, whereby oxidizing conditions are produced; under these conditions, it is believed that the corresponding alkali hypochlorite is formed, and this hypochlorite produces the oxidation by an ionic mechanism. Accordingly, it is preferred to employ from 1 to 2 moles, approximately, of alkali hydroxide per mole of trifluoroethanol in the reaction mixture. By an alkali hydroxide is herein meant the hydroxide of an alkali metal or alkaline earth metal. Illustrative of useful alkali hydroxides are alkali metal hydroxides, such as sodium hydroxide, potassium hydroxide, lithium hydroxide and so forth; and alkaline earth hydroxides, such as barium hydroxide, calcium hydroxide and the like. Sodium hydroxide by reason of its availability and low cost is preferred. With respect to temperature, in this embodiment, the reaction may be carried out at temperatures as low as —10° C. or lower, down to the freezing point of the reaction mixture, though temperatures up to about 250° C. may be used if desired. Temperatures from 0° to 100° C. are preferred. The reaction, in this embodiment, may if desired be energized by ultraviolet or other energizing radiation, but this is not essential to carrying out the process of the invention.

In carrying out the reaction, an aqueous solution of trifluoroethanol is treated with chlorine under conditions conducive to oxidation until reaction has occurred. The products of the present reaction comprise trifluoroacetaldehyde hydrate and trifluoroacetic acid; additionally, the formation of chlorotrifluoromethane by cleavage of trifluoroethanol has been noted in this reaction. Depending on factors such as the temperature and time of reaction and the particular oxidation system used, the extent of conversion of the trifluoroethanol and the proportions of these products obtained will vary, and the consumption of chlorine correspondingly may vary from about 1 to about 6 moles per mole of trifluoroethanol reacted. In general, less chlorine is consumed in the production of trifluoroacetaldehyde than of trifluoroacetic acid; and excess chlorine, in the ratio of 2 to 4 moles of chlorine per mole of trifluoroethanol, favors acid production as compared to production of trifluoroacetaldehyde. However, the ratio of the reactants is not the sole factor determining the proportion of the aldehyde and the acid in the product; reaction conditions such as temperature, time, intensity and type of energization also have a pronounced influence thereon.

Water is employed as the solvent medium for the reaction. If desired, additional solvents and diluents inert under the reaction conditions may be introduced into the reaction mixture when any advantage is to be gained thereby, such as ease of temperature control. Exemplary of suitable solvents or diluents are trifluoroacetic acid, trifluoroacetaldehyde hydrate, excess trifluoroethanol, trifluoroethyl trifluoroacetate, sulfuryl chloride and the like.

Generally, the reaction is conveniently carried out at atmospheric pressure, but if desired subatmospheric or superatmospheric pressures may be employed. Ordinarily, pressures below about 150 atmospheres are preferred, and generally the process is advantageously operated at the autogenous pressure of the reactants. The temperature of the reaction, as pointed out above, may range from, for example, about −20° C. up to 250° C.; but preferably is in the range of from 0 to 100° C. The time of reaction is dependent on the oxidizing conditions used, the type of energization employed and the temperature of the reaction. Ordinarily, reaction times will vary from less than one minute to several hours.

After completion of the reaction, the products may be isolated by usual processes such as evaporation, distillation and so forth. Generally, the reaction product is first conveniently neutralized by addition of an alkali such as sodium hydroxide, potassium hydroxide, sodium carbonate, and so forth; or an acid such as hydrochloric acid, sulphuric acid, trifluoroacetic acid and the like.

The trifluoroacetaldehyde hydrate may be extracted from the reaction mixture, before or after neutralization, with organic solvents immiscible with water such as ethers, butanol, diethyl ketone and the like.

The trifluoroacetic acid is advantageously isolated in the form of a corresponding salt, such as sodium trifluoroacetate or the like. The base with which the acid reacts to form the salt may be derived from the alkali hydroxide present in the reaction medium in accordance with one embodiment of this invention. Alternatively, such base may be introduced in neutralization of the reaction product as described above. Conveniently, the reaction product is first neutralized and then extracted with a water-immiscible solvent, after which the remaining aqueous solution may be evaporated to dryness to isolate the trifluoroacetic acid salt.

In the embodiment of this invention in which trifluoroethanol is oxidized with chlorine in the presence of energizing radiation, the reaction product may be an acidic solution containing free trifluoroacetic acid, which may if desired be isolated by distillation. As noted immediately hereinabove, in presence of a base, the trifluoroacetic acid is readily converted to the corresponding salt. Furthermore, under some conditions, trifluoroacetic acid formed in the reaction may react with unreacted trifluoroethanol in the reaction mixture so that the ester thereof is isolated; or instead, a trifluoroacetate ester may be formed by reaction of the acid with an alternative alcohol. The method of isolation chosen will determine whether the product is the acid, salt, or ester, and in the present specification and claims, where reference is made to the isolation of trifluoroacetic acid, it is intended to include thereby the production of such derivatives thereof in place of the acid.

It will be appreciated that in place of the batch processes described hereinbelow, the method of the present invention may be carried out as a continuous process with suitable choice of apparatus. Any unreacted trifluoroethanol can be recycled to the process.

Chlorotrifluoromethane is formed as a byproduct under some conditions in this reaction. It may be recovered for use as a refrigerant or the like, if desired.

The invention is illustrated but not limited by the following examples.

*Example 1*

This example illustrates the oxidation of trifluoroethanol with chlorine at low temperature in the presence of energizing radiation.

A mixture of 30 grams of trifluoroethanol, 44 grams of chlorine and 10 grams of water was sealed into a Pyrex glass tube and exposed to outdoor daylight for 28 days. At the end of this time all of the color of chlorine had bleached from the mixture. The tube was opened, and the reaction product neutralized with aqueous caustic soda solution and evaporated to dryness. Extraction of the residue with ethyl alcohol and treatment of the extract with sulphuric acid gave trifluoroacetic acid as the ethyl ester, in amount corresponding to 45% conversion of the trifluoroethanol.

*Example 2*

This example illustrates the oxidation of trifluoroethanol with chlorine in the presence of ultraviolet irradiation at somewhat higher temperature than in the preceding example.

A solution of 150 grams (1.5 moles) of trifluoroethanol in 55 cc. of water was chlorinated at 60–80° C. in the presence of ultraviolet irradiation. Effluent gases were scrubbed with aqueous caustic and condensed in a trap cooled with a mixture of acetone and Dry Ice. When the passage of chlorine into the reaction mixture was discontinued, after 2.25 hours, 83 grams of trifluoroethanol were recovered unreacted, by distillation. On neutralization of the reaction mixture with sodium hydroxide and evaporation, trifluoroacetic acid was isolated as the sodium salt in amount corresponding to 13.4% conversion and 30.4% yield of the fluoro acid. Chlorotrifluoromethane was isolated from the cold trap in amount (19.5 grams) corresponding to 12.5% conversion.

In this and other examples herein, conversion refers to the proportionate amount of trifluoroethanol converted to the stated product, as determined from the quantity of product obtained. Yield refers to the relationship between this conversion and the total quantity of trifluoroethanol converted to oxidation products, as determined by difference between the quantity of trifluoroethanol introduced into the reaction and the quantity recovered unchanged at the termination of the reaction.

*Example 3*

This example further illustrates the oxidation of trifluoroethanol with chlorine in aqueous solution and in the presence of ultraviolet radiation.

Chlorine was passed into a circulating solution of 200 grams (2 moles) of trifluoroethanol in 200 cc. of water, contained in a reactor illuminated by a 100 watt ultraviolet lamp. The reaction temperature was maintained at 35–40° C. After 3.25 hours, when 76 grams (1.07 mole) of chlorine had been added, the reaction mixture was neutralized with causitc soda solution and extracted with ether. The remaining aqueous part was evaporated to dryness. Trifluoroacetic acid was isolated as the sodium salt on evaporation of the aqueous part of the reaction mixture; it was present in amount corresponding to 2.2% conversion. Trifluoroacetaldehyde hydrate was obtained by distillation, in 18.4% conversion.

*Example 4*

This example illustrates the use of sodium hydroxide in the oxidation of trifluoroethanol with chlorine.

Chlorine was passed into a solution of 50 grams (0.5 mole) of trifluoroethanol and 40 grams (1 mole) of sodium hydroxide in 100 cc. of water at 0° C. and in the absence of light until chlorine absorption was negligible. The reaction mixture was then treated with sodium bisulphite to remove unreacted chlorine, neutralized with dilute caustic soda solution and evaporated to dryness, whereby trifluoroacetic acid was obtained as the sodium salt in 22% conversion and 96% yield.

*Example 5*

Chlorine was passed into a circulating mixture of 100 grams (1 mole) of trifluoroethanol, 80 grams (2 moles) of sodium hydroxide and 125 cc. of water at 40–50° C. in a reactor illuminated by ultraviolet radiation for 2.5 hours, at which time 112 grams of chlorine had been passed in. The exit gases were scrubbed with caustic and trapped, as in Example 2. On completion of this reaction, the reaction product was extracted with ether. By distillation of the ether extract, trifluoroacetaldehyde hydrate was obtained in 5.1% conversion. Trifluoroacetic acid was isolated as the sodium salt in 17% conversion from the remaining aqueous reaction product. Chlorotrifluoromethane condensed in the cold trap connected to the apparatus represented 12.5% conversion of the trifluoroethanol.

While the invention has been described with reference to the various particular embodiments thereof, it will be appreciated that other modifications and variations can be made within the scope of the invention.

What is claimed is:

1. Method for the oxidation of 2,2,2-trifluoroethanol to a product selected from the group consisting of trifluoroacetic acid and trifluoroacetaldehyde hydrate which comprises reacting 2,2,2-trifluoroethanol with an oxidizing agent consisting essentially of chlorine in an aqueous medium and in the presence of an energy source comprising actinic radiation effective for the activation of chlorine.

2. Method for production of trifluoroacetic acid which comprises reacting 2,2,2-trifluoroethanol with an oxidizing agent consisting essentially of chlorine in an aqueous medium and in the presence of an energy source comprising actinic radiation effective for the activation of chlorine and isolating trifluoroacetic acid from the resulting reaction product.

3. The method for the oxidation of 2,2,2-trifluoroethanol to trifluoroacetic acid which comprises reacting 2,2,2-trifluoroethanol with an oxidizing agent consisting essentially of chlorine in an aqueous medium and in the presence of an energy source comprising actinic radiation effective for the activation of chlorine.

4. The method for the oxidation of 2,2,2-trifluoroethanol to a product selected from the group consisting of trifluoroacetaldehyde hydrate and alkali salt of trifluoroacetic acid which comprises reaction 2,2,2-trifluoroethanol with an oxiding agent consisting essentially of chlorine in the presence of an aqueous solution of an alkali hydroxide and in the presence of an energy source comprising actinic radiation effective for the radiation of chlorine.

5. The method of claim 1 wherein said chlorine is reacted with 2,2,2-trifluoroethanol at a temperature of from about 0° to about 100° C.

6. The method of claim 4 wherein said energy source is ultraviolet radiation.

7. The method for the oxidation of 2,2,2-trifluoroethanol which comprises reacting 2,2,2-trifluoroethanol with chlorine in the presence of an aqueous solution of an alkali metal hydroxide and in the absence of energizing radiation and isolating trifluoroacetic acid from the resulting reaction product.

8. The method of claim 7 wherein said alkali metal hydroxide is sodium hydroxide.

9. The method for the production of 2,2,2-trifluoroacetaldehyde hydrate which comprises reacting 2,2,2-trifloroethanol with chlorine in the presence of an aqueous solution of sodium hydroxide and isolating trifluoroacetaldehyde hydrate from the resulting reaction product.

10. The method of claim 2 wherein said radiation is ultraviolet radiation.

11. The method of claim 2 wherein said chlorine is reacted with 2,2,2-trifluoroethanol at a temperature of from about 0° to about 100° C.

12. The method of claim 1 wherein said energy source is ultraviolet radiation.

13. Method for the production of trifluoroacetaldehyde hydrate which comprises reacting 2,2,2-trifluoroethanol with chlorine in an aqueous medium and in the presence of a energy source comprising actinic radiation effective for the activation of chlorine and isolating trifluoroacetaldehyde hydrate from the resulting reaction product.

References Cited in the file of this patent

UNITED STATES PATENTS

| | | |
|---|---|---|
| 2,192,288 | Hale | Mar. 5, 1940 |
| 2,196,581 | Stephenson et al. | Apr. 9, 1940 |
| 2,371,757 | Henne | Mar. 20, 1945 |
| 2,444,924 | Farkas et al. | July 13, 1948 |
| 2,559,629 | Berry | July 10, 1951 |

OTHER REFERENCES

Chemical Society Journal (1955), p. 2151 and 2155 (London).